(No Model.) 3 Sheets—Sheet 1.
W. B. DAVIS.
KINETOGRAPHIC CAMERA.
No. 601,951. Patented Apr. 5, 1898.
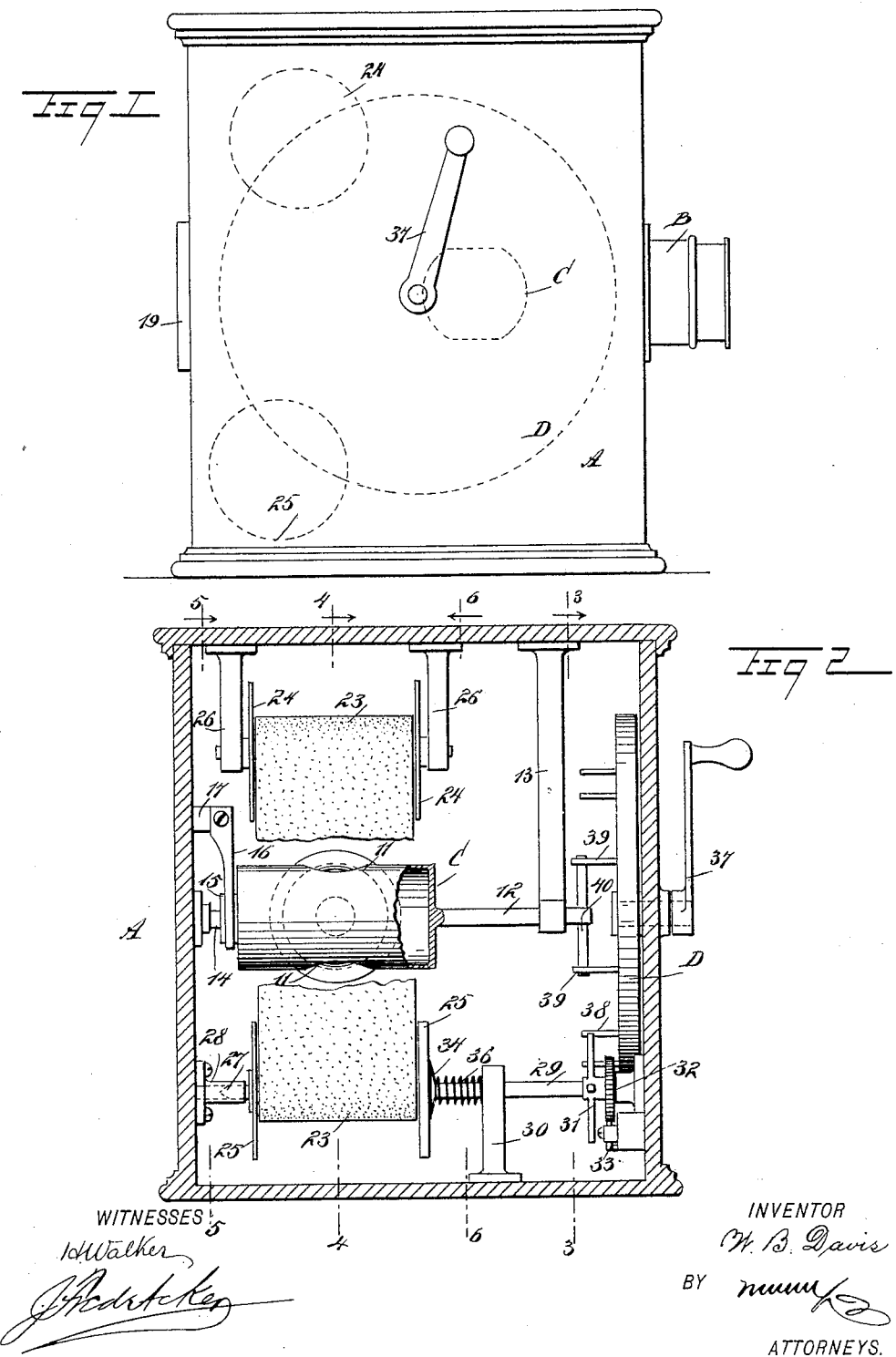
WITNESSES
Id Walker
INVENTOR
W. B. Davis
BY
ATTORNEYS.

(No Model.)  3 Sheets—Sheet 2.

W. B. DAVIS.
KINETOGRAPHIC CAMERA.

No. 601,951.  Patented Apr. 5, 1898.

WITNESSES:
H. Walker
J. Dedecker

INVENTOR
W. B. Davis
BY
Munn
ATTORNEYS.

(No Model.) 3 Sheets—Sheet 3.
W. B. DAVIS.
KINETOGRAPHIC CAMERA.
No. 601,951. Patented Apr. 5, 1898.
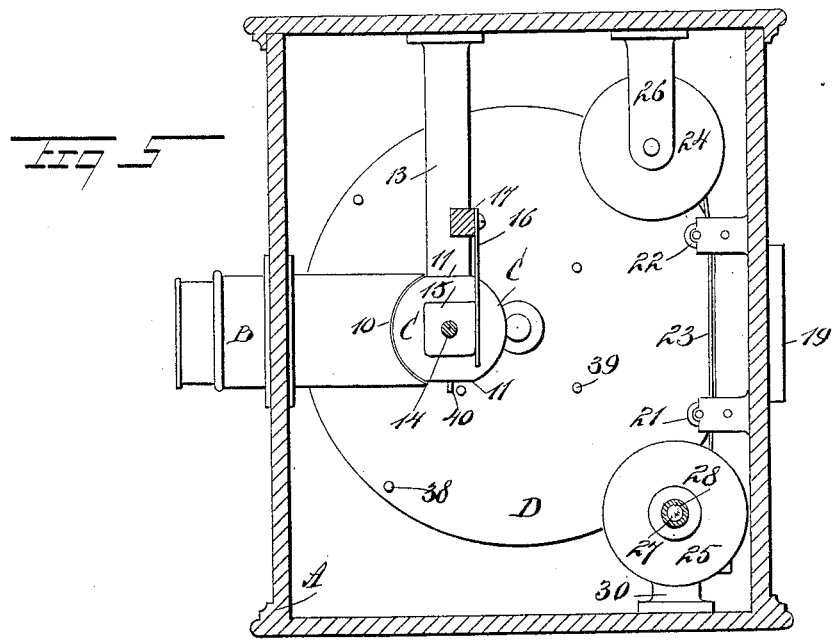
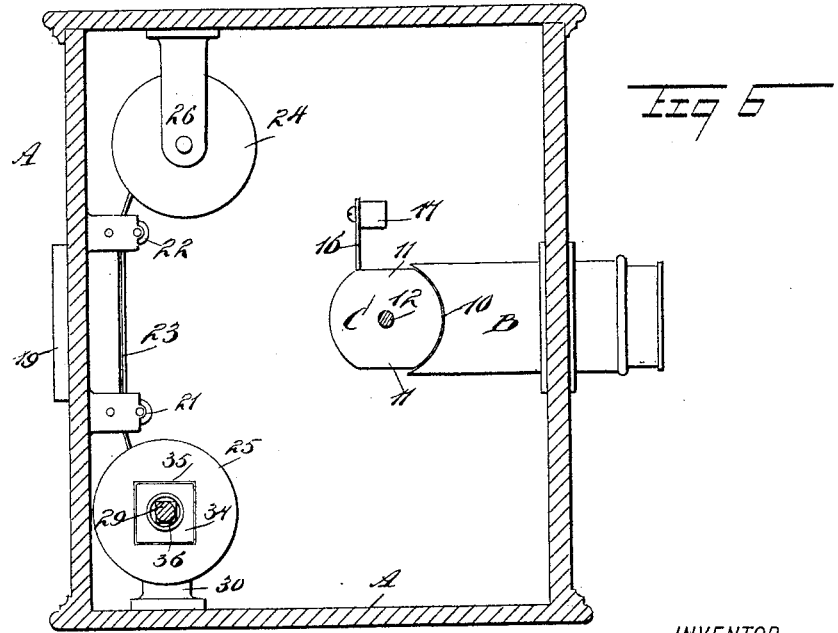
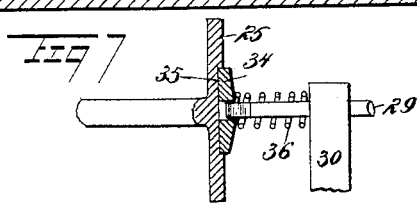
WITNESSES:
H. Walker
Fred Acker
INVENTOR
W. B. Davis.
BY
Munn
ATTORNEYS.

UNITED STATES PATENT OFFICE.

WARREN B. DAVIS, OF BROOKLYN, NEW YORK.

KINETOGRAPHIC CAMERA.

SPECIFICATION forming part of Letters Patent No. 601,951, dated April 5, 1898.

Application filed April 13, 1897. Serial No. 631,967. (No model.)

*To all whom it may concern:*

Be it known that I, WARREN B. DAVIS, of Brooklyn, in the county of Kings and State of New York, have invented a new and Improved Camera, of which the following is a full, clear, and exact description.

The object of the invention is to provide a camera especially adapted for taking kinetoscopic pictures, and the camera is adapted also particularly for use in connection with a display device for kinetoscopic pictures, forming the subject-matter of an application filed concurrently herewith.

A further object of the invention is to provide a camera which will be simple, durable, and economic and in which a master-wheel is employed for operating both the shutter and the film, the two parts being consecutively moved, whereby a series of negatives may be rapidly and conveniently made.

Another object of the invention is to so operate the shutter and the film-holders that whenever the shutter is brought in position for an exposure a predetermined area only of the surface of the film will be brought under the influence of the lens, the master-wheel acting in such a manner upon the shutter and the film that one negative will so closely follow the other that there will be comparatively no space between them.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
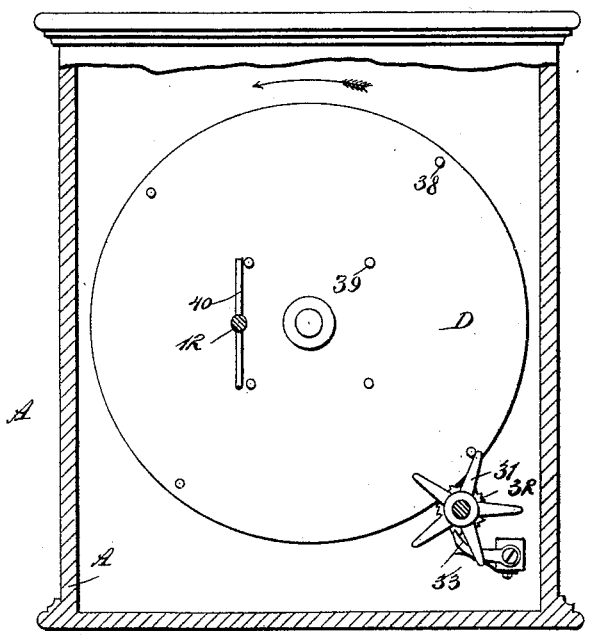
Figure 4:
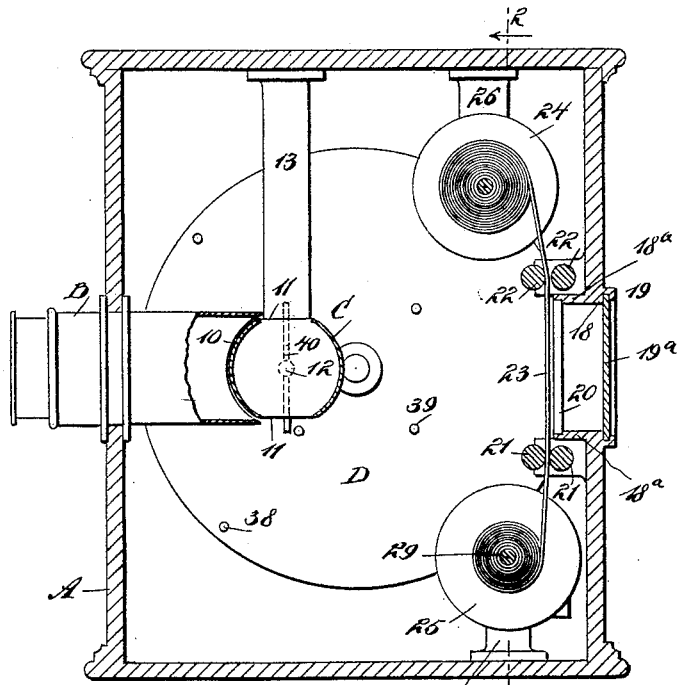

Figure 1 is a side elevation of the camera. Fig. 2 is a vertical section taken practically on the line 2 2 of Fig. 4. Fig. 3 is a vertical section on the line 3 3 of Fig. 2. Fig. 4 is a section on the line 4 4 of Fig. 2. Fig. 5 is a section on the line 5 5 of Fig. 2. Fig. 6 is a section on the line 6 6 of Fig. 2, and Fig. 7 is a detail view illustrating the manner of holding one of the reels for the film in position in the casing.

The casing A may be of any desired shape and of any approved material and is provided at its front with a lens B, the inner end of the lens-tube being preferably given a concaved shape, as shown at 10 in the drawings, particularly in Figs. 4 and 5, in order that a cylindrical shutter C may revolve close to the inner end of the lens, the said cylindrical shutter being closed at its end portions and provided with an opening 11 in each side, the openings being diametrically opposite. One of the trunnions 12 of the shutter is journaled in a hanger 13, (shown in Fig. 2,) while the opposite trunnion 14 is shown in the drawings as journaled in bearings attached to the casing. A square or polygonal surface 15 is formed upon the trunnion 14 close to the end of the shutter, the said surface 15 being engaged by the free end of a spring 16, attached to a bracket 17, secured, ordinarily, to the casing, the spring 16 being for the purpose of preventing the shutter from rotating beyond the position for exposure or a position to completely close the inner end of the lens.

At the back of the casing immediately opposite the lens B an opening 18 is made, surrounded by an inwardly-extending flange $18^a$, as shown in Fig. 4, and an outwardly-extending grooved flange 19, in which a slide $19^a$ is mounted, while at the inner end of the inner flange of the opening 18 a ground glass 20 is secured, so that by opening the slide $19^a$ it may be readily ascertained whether the lens has been properly focused.

Below the opening 18 in the back of the casing ordinarily two guide-rollers 21 are placed side by side, and above the said opening two corresponding guide-rollers 22 are located within the casing, both being provided with suitable supports. The film 23 is passed between these rollers across the ground glass 20, and that portion of the film between the rollers is the portion upon which the picture is to be taken. One end of the film 23 is secured to a reel 24 at the upper portion of the casing, the opposite end being attached to a reel 25 in the lower portion of the casing. The upper reel 24 is held to turn in suitable hangers 26, as shown particularly in Fig. 2, while the lower reel 25, which is removable and upon which the film is wound as the exposures are made, is provided with a trunnion 27, held to turn in a socket 28, secured to the side of the casing, as is also shown in Fig. 2. The opposite side of the lower reel 25, as illustrated in Fig. 7, is provided at its outer face at its center with a rectangular depression 35, in which a block 34 of similar shape is introduced. The squared end of a shaft 29 is introduced into the opening of the block 34, whereby when the shaft is revolved the reel will be compelled to turn. The shaft 29 is mounted at one end in a suitable bearing attached to the side of the casing and is likewise supported by a hanger 30 intermediate of the ends of the shaft. A spring 36 is coiled around the squared portion of the shaft 29, engaging with the intermediate hanger and the block 34, so that by slipping the block 34 on the shaft 29 in direction of the hanger 30 the lower reel 25 may be readily removed from its normal position. Near the end of the shaft 29 which is adjacent to the side of the casing a star-wheel 31 is secured, together with a ratchet-wheel 32, engaged by a pawl 33, which is located on the casing, the pawl and ratchet-wheel compelling the shaft 29 to turn in one direction only.

A master-wheel D is employed for imparting movement to the shutter and to the film upon which the impressions are to be taken. The master-wheel D is journaled at one side of the casing and is turned by an attached crank 37 or its equivalent. The master-wheel is provided with peripheral pins 38 upon its inner face, or with pins adjacent to the periphery, and is further provided with a second set of pins 39, which pins are located nearer the center of the master-wheel. The pins of a series are at equal distances apart. Arms 40 are projected in diametrically opposite directions from the end of the trunnion 12 of the shutter, the arms constituting a double lever, and these arms are adapted for engagement with the pins 39 of the inner series on the master-wheel, while the pins 38 of the outer series of said master-wheel are intended to engage with the star-wheel 31.

In the operation of this camera an arm of the star-wheel will be engaged by one of the pins and the said wheel turned to such an extent as to draw a sufficient quantity of the film from the upper to the lower reel to present an entirely plain surface to the field of the lens. Immediately after the adjustment of the film a pin of the inner series on the master-wheel will engage with an arm of the double lever 40 and will compel the shutter C to make a quick revolution, bringing the openings 11, which are normally held out of the field of the lens, within said field and within range of the surface of the film to receive an impression.

The construction of this camera is exceedingly simple. Many pictures may be taken accurately and rapidly, and the camera is in every way adapted for taking kinetoscope views, and especially for taking such views as are to be exhibited on the kinetoscope referred to in the preamble of this specification.

Having thus described my invention, I claim as new and desire to secure by Letters Patent—

1. The combination, with a lens whose tube has a concaved inner end, and a cylindrical shutter held to revolve close to the concaved surface of the lens-tube, said cylindrical shutter being provided with diametrically opposite openings arranged for the passage of light from one side of the shutter to the other, of a film-carrying device, and mechanism for operating both the shutter and the film-carrying device.

2. The combination, with a lens whose tube has a concaved inner end, and a rotatable shutter adjacent to the concaved surface of the lens-tube, the said shutter being of hollow cylindrical construction and having diametrically opposite openings in its sides, of a film-carrying device, a master-wheel, and a time driving connection between the master-wheel, the film-carrying device and said shutter.

3. The combination, with a lens, and a rotatable shutter adjacent to the lens, of hollow cylindrical construction and provided with diametrically opposite openings in its sides, of a detent for the said shutter, a film-carrying device, a feed for the film-carrying device, a master-wheel, a connection between the master-wheel and said feed for the film, a shifting device for the shutter, and a connection between the said shifting device and the master-wheel, substantially as shown and described.

4. The combination, with a lens, a rotatable hollow cylindrical shutter held to turn in close proximity to the inner end of the lens, being provided with diametrically opposite openings, one in each side, and a two-armed lever connected with a trunnion of the said shutter, of a detent for the said shutter, film-carrying reels, one of which is provided with a star-wheel, a master-wheel, and two series of pins located on the master-wheel, one series of pins being arranged for engagement with the star-wheel and the other series being arranged for engagement with the double-armed lever.

5. The combination, with a lens, a rotatable hollow cylindrical shutter held to turn in close proximity to the inner end of the lens, being provided with diametrically opposite openings, one in each side, and a two-armed lever connected with a trunnion of the shutter, of a detent for said shutter, film-carrying reels, one of which is provided with a star-wheel, a master-wheel, and two series of pins located on the master-wheel, one series of pins being arranged for engagement with the star-wheel and the other series for engagement with the double-armed lever, a ratchet-and-pawl mechanism connected with the support for the star-wheel, and guide-rollers between which the film passes from one reel to the other.

WARREN B. DAVIS.

Witnesses:
J. FRED. ACKER,
A. H. DAVIS.